United States Patent
Jia et al.

(10) Patent No.: US 9,162,207 B2
(45) Date of Patent: Oct. 20, 2015

(54) FLUIDIZED-BED REACTOR AND HYDROTREATING METHOD THEREOF

(75) Inventors: Li Jia, Fushun (CN); Yongzhong Jia, Fushun (CN); Hailong Ge, Fushun (CN)

(73) Assignees: China Petroleum & Chemical Corporation, Beijing (CN); Fushun Research Institute of Petroleum & Petrochemicals Sinopec, Fushun, Liaoning Province (CN)

( * ) Notice: Subject to any disclaimer, the term of this patent is extended or adjusted under 35 U.S.C. 154(b) by 545 days.

(21) Appl. No.: 13/502,218

(22) PCT Filed: Oct. 19, 2010

(86) PCT No.: PCT/CN2010/001641
§ 371 (c)(1),
(2), (4) Date: Apr. 16, 2012

(87) PCT Pub. No.: WO2011/047538
PCT Pub. Date: Apr. 28, 2011

(65) Prior Publication Data
US 2012/0205288 A1  Aug. 16, 2012

(30) Foreign Application Priority Data

Oct. 21, 2009  (CN) .......................... 2009 1 0204286
Oct. 21, 2009  (CN) .......................... 2009 1 0204287

(51) Int. Cl.
*B01J 8/22* (2006.01)
*B01J 8/18* (2006.01)
(Continued)

(52) U.S. Cl.
CPC  *B01J 8/226* (2013.01); *B01J 8/007* (2013.01); *B01J 8/1854* (2013.01); *B01J 8/1872* (2013.01);
(Continued)

(58) Field of Classification Search
CPC ........ C10G 45/16; C10G 45/20; C10G 45/42; C10G 45/56; C10G 47/26; C10G 47/30; C10G 49/12; C10G 49/16; B01J 8/005; B01J 8/08; B01J 8/18; B01J 8/1845; B01J 8/1854; B01J 8/1872; B01J 8/24; B01J 8/226
USPC .......................... 422/139, 140, 147; 208/143
See application file for complete search history.

(56) References Cited

U.S. PATENT DOCUMENTS

| RE25,770 E | 4/1965 | Johanson et al. |
| 3,398,085 A | 8/1968 | Engle et al. |

(Continued)

FOREIGN PATENT DOCUMENTS

| CN | 2187492 | 1/1995 |
| CN | 1335357 | 2/2002 |

(Continued)

OTHER PUBLICATIONS

English Machine Translation for CN 101376092, provided by Google. Mar. 2009.*

(Continued)

*Primary Examiner* — Renee E Robinson
(74) *Attorney, Agent, or Firm* — Finnegan, Henderson, Farabow, Garrett & Dunner LLP

(57) ABSTRACT

The invention relates to a fluidized bed reactor and a hydrogenation method thereof. The fluidized bed reactor (7) comprises a reactor shell (103) vertical to the ground and a phase separator (111) at the upper part of the shell (103). An inner circulation zone is provided under the phase separator (111), and comprises a cylinder (114), a tapered diffusion section (115) and a guiding structure (104). In the hydrogenation method using the fluidized bed reactor (7), an expanded bed reactor (3) is used to further hydrogenate part of the product from the fluidized bed reactor (7), and supply catalyst without influencing on the stable operation of the fluidized bed reactor (7).

25 Claims, 2 Drawing Sheets

(51) Int. Cl.

| | |
|---|---|
| *C10G 45/56* | (2006.01) |
| *C10G 49/16* | (2006.01) |
| *C10G 47/30* | (2006.01) |
| *B01J 8/00* | (2006.01) |
| *B01J 23/85* | (2006.01) |
| *B01J 23/883* | (2006.01) |
| *B01J 35/02* | (2006.01) |
| *B01J 35/10* | (2006.01) |
| *C10G 1/06* | (2006.01) |
| *C10G 45/08* | (2006.01) |
| *C10G 45/20* | (2006.01) |
| *C10G 65/04* | (2006.01) |
| *B01J 21/04* | (2006.01) |

(52) U.S. Cl.
CPC ............... *B01J 23/85* (2013.01); *B01J 23/883* (2013.01); *B01J 35/023* (2013.01); *B01J 35/108* (2013.01); *B01J 35/1042* (2013.01); *B01J 35/1061* (2013.01); *C10G 1/06* (2013.01); *C10G 45/08* (2013.01); *C10G 45/20* (2013.01); *C10G 45/56* (2013.01); *C10G 47/30* (2013.01); *C10G 49/16* (2013.01); *C10G 65/04* (2013.01); *B01J 21/04* (2013.01); *B01J 2208/0084* (2013.01); *C10G 2300/107* (2013.01); *C10G 2300/1033* (2013.01); *C10G 2300/1077* (2013.01); *C10G 2300/4018* (2013.01)

(56) References Cited

U.S. PATENT DOCUMENTS

| | | | |
|---|---|---|---|
| 4,398,852 | A | 8/1983 | Milligan |
| 5,360,535 | A | 11/1994 | Liu et al. |
| 7,390,398 | B2 | 6/2008 | Farshid et al. |
| 7,431,831 | B2 | 10/2008 | Farshid et al. |
| 2007/0209965 | A1 | 9/2007 | Duddy et al. |

FOREIGN PATENT DOCUMENTS

| | | |
|---|---|---|
| CN | 1362477 A | 8/2002 |
| CN | 1448212 | 10/2003 |
| CN | 1458234 | 11/2003 |
| CN | 101054534 | 10/2007 |
| CN | 101240190 | 8/2008 |
| CN | 101356252 | 1/2009 |
| CN | 101360808 | 2/2009 |
| CN | 101376092 | 3/2009 |
| CN | 101376834 | 3/2009 |
| CN | 101418222 | 4/2009 |

OTHER PUBLICATIONS

International Search Report mailed Jan. 27, 2011, for International Application No. PCT/CN2010/001641.
Written Opinion of the International Searching Authority mailed Jan. 27, 2011, for International Application No. PCT/CN2010/001641.

* cited by examiner

FLUIDIZED-BED REACTOR AND HYDROTREATING METHOD THEREOF

TECHNICAL FIELD

The present invention relates to a reactor and a process using the reactor, and more specifically, to a fluidized bed reactor and a hydrogenation method thereof.

BACKGROUND ART

Following developments of heavy crude oil and changes of the demand structure for petroleum products around the world, the market shows a rapidly increasing demand for light fuel oil and fast decreasing demand for heavy fuel oil. Heavy oil processing technology has become a crucial R&D subject for oil-refining industry. The heavy oil processing technology mainly comprises decarbonization and hydrogenation.

Decarbonization mainly comprises solvent deasphalting, coking and heavy oil catalytic cracking, etc. Though the facility investment for decarbonization is low, the yield and quality of liquid products are low, and the decarbonization cannot satisfy the current environmental requirements. At the same time, as there is a serious trend that the crude oil is becoming heavier and inferior in quality, the proportion of the residual oil yield against the crude oil is increasing by year, even reaching 70 wt % or above. The decarbonization technology most commonly used for heavy or residual oil is coking, which generally produces a large amount of low value-added coke as side product.

Hydrogenation method, according to the state that catalyst exists in the reactor, is specifically divided to hydrogenation with fixed bed, hydrogenation with moving bed, hydrogenation with suspended bed, and hydrogenation with fluidized bed. In the process comprising hydrogenation, the investment is high because high pressure reaction device is used, but the product quality is good and the liquid yield is high. It may lighten heavy or residual oil at the utmost level. At the moment, the comparatively mature residual oil hydrogenation technology is hydrogenation of residual oil with fixed bed, but this technology is restricted by the nature of the raw material, and has a comparatively strict requirement on some parameters such as metal in raw material and carbon residue etc. Suspended bed and moving bed technologies both have certain advantages in heavy oil processing, but are developed quite slowly in recent years. As in the hydrogenation method with suspended bed a rich amount of heavy metal exists in the tail oil, the processing and utilization of tail oil are very difficult. In the hydrogenation method with moving bed, the crude oil and catalyst will generally pass through the reactor in the same direction or in reverse directions, and heavy oil is processed using the initial activity of catalyst. This method has a fairly good hydrogenation effect, but requires a large amount of catalyst, and the hydrogenation activity of catalyst is not utilized sufficiently.

Currently, fluidized bed hydrogenation technology can realize catalyst's online addition and discharge, be adaptable to a variety of raw material and can guarantee a long-term operation. As such, this technology is developing fast. The fluidized bed reactor is a tri-phase fluid bed, i.e., air, liquid and solid phases. It can treat inferior heavy crude oil with high content of metal and bitumen. It has the characteristics including low pressure drop, homogeneous temperature distribution, constant catalyst activity during the whole operation cycle, and capability of adding fresh catalyst and removing waste catalyst during operation.

The online adding and discharging technology of catalyst is crucial in ensuring product quality, stable operating conditions and long-term operation for the fluidized bed. Currently, on-line catalyst-addition means in the fluidized bed hydrogenation technology generally comprise gas-phase transportation, liquid-phase transportation, or direct addition of solid catalyst from a high-pressure storage tank at the upper part of the reactor to the fluidized bed reactor under gravity. To keep catalyst in the fluidized bed reactor in an excellent fluidizing state, the liquid viscosity, reaction pressure, gas-liquid flow speed and reaction temperature shall be maintained constant in the reactor. Nevertheless, directly adding fresh catalyst into the fluidized bed reactor may easily cause transient fluctuation of the above conditions, resulting in transient instability on fluid state and operating conditions within the reactor. Further, since the initial activity of fresh catalyst is high, adding it directly into the fluidized bed reactor and enabling it to contact and mix with inferior heavy residual oil raw material will result in rapid carbon accumulation of catalyst and fast activity loss, which will influence hydrogenation effect of the reaction flow and increase replacement frequency of catalyst.

CN101418222A, CN1335357A and CN101360808A are some prior arts relating to treatment of inferior residual oil. CN101418222A discloses a combined reaction device of a fluidized bed and a suspended bed. CN1335357A discloses a combined reaction device of an expanded bed and a moving bed. CN101360808A discloses at least two upflow reactors in series. None of these prior arts, however, discloses the on-line treatment of catalyst when the catalyst within the reactor cannot meet the requirement on activity.

U.S. Pat. No. 4,398,852 describes a method for on-line addition of catalyst for a fluidized bed reactor, which comprises the following steps: first adding the catalyst into a high-pressure resistant catalyst-containing container, charging hydrogen into the container to reach the reaction pressure, and opening the valve arranged in the line connecting the catalyst container with the reactor, so that the catalyst enters into the fluidized bed reactor by gravity. In this process, catalyst is directly added into the fluidized bed reactor by gravity, which lead to a rapid carbon accumulation when initially active catalyst contacts with inferior raw material, hence deactivation rate and replacement frequency of catalyst are both enhanced. At the same time, as the temperature pre-heating catalyst and hydrogen is lower than the reaction temperature, the reaction temperature within the fluidized bed will be fluctuated, rendering an unstable operating condition and a low product quality.

U.S. Re 25,770 and U.S. Pat. No. 4,398,852 describe a typical technology of the fluidized bed, in which an inner circulation cup is arranged in the fluidized bed reactor for gas-liquid separation, with which the liquid conversion rate is improved. This technology, however, has the following deficiencies in its practical use: there is a small storage amount of catalyst within the reactor, and the space utilization of the reactor is low; the maintenance of the circulation pump is costly; and once the circulation pump works abnormally or is damaged, catalyst will be sunk and aggregated so that the device has to stop running. Further, when the liquid product in the reactor stays for too long a time under non-catalytic hydrogenation conditions, it will easily be subject to a second thermal cracking reaction to form coke under a high temperature, resulting in an inferior product quality.

CN 02109404.7 and CN101376092A respectively describe a new type of fluidized bed reactor, wherein a tri-phase separator with a guiding aperture is used for effective separation of gas, liquid and solid phases. As compared with typical fluidized bed reactors, it has a simple structure, is easy to operate and has a high utilization rate. Nevertheless, as the height-diameter ratio of the fluidized bed reactor is rather big, generally 1:6 to 1:8, and most of the effective reaction space is an empty tube structure except the tri-phase separator at the top of the reactor, there lacks a positive mass transfer structure, so that the mass transfer effect among gas, liquid and solid is rather poor. Thus, the hydrogenation effect of liquid phase product is insignificant, and the product quality is poor. Further, the fluidized bed reactor is a back-mixing reactor, i.e., part of unreacted raw material is discharged out of the reactor together with reacted flow, hence the conversion rate of raw material is rather low.

There is a fluidized bed in the prior arts which contains two reaction sections or above. Such a fluidized bed reactor has a tri-phase separating component for separating gas, liquid and solid, and it may also realize hydrodemetallization, hydrodesulfurization and hydrodenitrification in sequence, wherein one to two catalysts are used in each reaction section. Said tri-phase separating component consists of a flow-guiding element and a flow-blocking element, wherein the flow-guiding element is a taper or a cone that opens at both ends with one opening smaller than the other, and an upper flow-guiding element and a lower flow-guiding element are used, where the upper end of the lower flow-guiding element is coaxially matched with the lower end of the upper flow-guiding element. Such a reactor is actually a large reactor formed by a combination of two reactors, with the lines connecting the reactors and other devices such as separators and sinking tanks removed. Although with the advantage that heat energy can be reasonably utilized, it still has the following disadvantages: the reactor is huge, causing difficulties in transportation, installation, operation and maintenance; with the increase of reaction sections in one reactor, the number of tri-phase separators also increases, hence the structure of the whole reactor is complicated; also, the more tri-phase separators, the more space they will occupy in the reactor, and the smaller effective reaction space for gas, liquid and solid there will be left, which means the resources will be wasted since the fluidized bed reactor operated under high temperature and high pressure is very costly; further, for the operation under multiple sections connected in series, it requires a stable operating condition and a very good design of gas-liquid distribution plate between sections, and when there are transient fluctuations, the separating effect of the tri-phase separator will be influenced, such that the solid entrained with the gas and liquid will block the distribution plate and influence the normal stable operation of the device.

SUMMARY OF THE INVENTION

To overcome deficiencies in the prior arts, the present invention provides a fluidized bed reactor, in which several inner circulation zones are provided and the conversion rate of raw material is effectively increased.

To achieve the above purpose, the invention provides a fluidized bed reactor comprising a reactor shell vertical to the ground and a phase separator located at the upper part of the shell. An inner circulation zone is provided under the phase separator, and comprises a cylinder, a tapered diffusion section and a guiding structure, wherein said cylinder and said tapered diffusion section arranged at the lower end of the cylinder are both located within the reactor shell, and said guiding structure is located on the inner wall of the reactor shell at the lower end of the tapered diffusion section. Said guiding structure is an annular protrusion on the inner wall of the reactor, the longitudinal section thereof along the axis of the reactor being one selected from a group consisting of trapezoid, arch, triangle, semicircle, or any other equivalent or modified shape having guiding function, which shall all be within the protection scope of the present invention. The upper end of the cylinder is a flare-shaped structure slightly spreading out.

The specific structure of the new fluidized bed reactor according to the present invention is as follows.

At the bottom of the reactor shell an inlet of raw material and a gas-liquid distribution plate are provided. At the top of the reactor shell there is a gas outlet, and on the upper part of the shell wall there is a liquid outlet, which is located on the reactor shell wall between the opening of the upper end of the inner cylinder of the phase separator and the opening of the lower end of the outer cylinder thereof. Said phase separator is arranged in the upper space within the shell, comprising two concentric cylinders with different inner diameters, i.e., the inner cylinder and the outer cylinder. The upper and lower ends of the inner and outer cylinders are all open, wherein the opening of the upper end of the outer cylinder is higher than the opening of the upper end of the inner cylinder, and the opening of the lower end of the outer cylinder is also higher than the opening of the lower end of the inner cylinder. The lower end of the inner cylinder is a tapered diffusion section, and the diameter of the opening of this diffusion section (i.e., the opening at the lower end of the inner cylinder) is less than the inner diameter of the reactor. And the lower end of the outer cylinder is also a tapered diffusion section, and the diameter of the opening of this diffusion section (i.e., the opening at the lower end of the outer cylinder) is also less than the inner diameter of the reactor.

The inner cylinder of the phase separator constitutes the central tube of the separator. The annular space between the inner cylinder and the outer cylinder forms the baffling cylinder of the separator. The annular space between the outer cylinder and the inner wall of the reactor is a region for collecting clean liquid product of the phase separator. The opening at the lower end of the inner cylinder is a flow inlet. The annular opening formed by the opening of the lower end of the inner cylinder and the inner wall of the reactor is a catalyst downflow feeding opening of the phase separator, where the separated solid catalyst particles return to the catalyst bed.

The specific size and relative position of each component of the phase separator can be determined by persons skilled in the art according to the size of the catalyst, the capacity of the reactor, the reaction conditions and the separating effect, by calculation or simple test, or by conventional means in the art, for example, those disclosed in CN02109404.7 or CN101376092A in name of the same applicant.

Said inner circulation zone comprises a cylinder, a tapered diffusion section and an adjacent guiding structure. The cylinder is connected with the tapered diffusion section, wherein the diameter of the lower opening of the tapered diffusion section is less than the inner diameter of the reactor. The guiding structure is adjacent to the tapered diffusion section. Thus the three components form the inner circulation zone. According to the requirements on the height to diameter ratio of the reactor and the conversion depth, one or more, preferably 2-3, inner circulation zones may be provided in the reactor, wherein the inner diameters of cylinders may be the same or different in different inner circulation zones. Said guiding structure can be an annular protrusion arranged on the inner wall of the reactor, the longitudinal section thereof along the axis of the reactor being one selected from a group consisting of trapezoid, arch, semicircle, triangle, or any other equivalent or modified shape having guiding function, which shall all be within the protection scope of the present invention.

The tangent at the intersecting point of the side of the guiding structure adjacent to the phase separator with the reactor wall forms an angle with the inner wall of the reactor, which is defined as coverage angle. Said coverage angle is an acute angle, which is preferably less than 60 degrees. The tangent at the intersecting point of the other side of the guiding structure away from the phase separator with the reactor wall forms an angle with the inner wall of the reactor, which is defined as friction angle. The friction angle is also an acute angle, which is preferably less than 60 degrees. The diameter of the guiding aperture formed by the guiding structure is between the diameter of the inner cylinder and that of the outer cylinder of the phase separator.

According to the fluidized bed hydrogenation reactor of the present invention, an additional guiding structure can be provided immediately adjacent to the phase separator from below. The additional guiding structure is positioned at the middle-upper part within the reactor, between the phase separator and the inner circulation zone. Said additional guiding structure is similar to the guiding structure in the inner circulation zone.

Said gas outlet is generally positioned at the center of the top of the reactor.

To discharge the separated clean liquid out of the reactor, the liquid outlet is generally arranged at the upper wall of the reactor shell, between the opening at the upper end and the opening at the lower end of the outer cylinder of the phase separator.

Generally at the upper part of the phase separator a buffering space is provided, where the gas product after phase separation is enriched and discharged out of the reactor from the gas outlet.

Generally, the diameter-height ratio of the reactor is between 0.01 and 0.1.

The fluidized bed reactor of the present invention generally further comprises at least one component for discharging catalyst from said reactor, and at least one component for feeding fresh catalyst into said reactor. Said component for feeding fresh catalyst is generally provided at the top of the reactor, while the component for discharging catalyst is generally provided adjacent to the bottom of the reactor. For instance, at the top of the reactor shell is provided a catalyst feeding pipe, and at the bottom thereof is provided a catalyst discharging pipe. Said catalyst replacement system and its application method can be any suitable devices or methods, e.g., the methods disclosed in U.S. Pat. No. 3,398,085 or U.S. Pat. No. 4,398,852.

To have the reaction raw material homogeneously contacted with the catalyst in the reactor, generally a gas-liquid distribution plate is provided at the bottom within said cylindrical reactor shell. The gas-liquid distribution plate can be of any structure that may facilitate homogeneous distribution of gas and liquid, e.g., a bubble cap structure.

The principle of the inner circulation zone of the fluidized bed reactor is as follows. When the material stream flows through the reactor sections with different cross-sectional areas, the flow speed varies. The material stream in a fluidized bed reactor consists of three phases, i.e., the gas phase, the liquid phase, and the solid phase, specifically, the solid-state catalyst, the liquid-state reaction flow, and the gas-state hydrogen and resulted light hydrocarbon. When the cross-sectional areas of the reactor sections through which the flow passes change, the flow speed of gas and liquid will also change, in which case the catalyst entrained with the gas-liquid flow will be rapidly hoisted or subsided. As the reaction proceeds in the fluidized bed reactor, the liquid-phase raw material will generate part of the light components, which flow up with hydrogen through the reactor, while part of the reacted liquid-phase resultant and the unreacted raw material will have a similar moving state to catalyst, i.e., a rapid upward flow at the fluid acceleration zone having a smaller cross-sectional area within the reactor, and a counter flow opposite to the main stream flow at the position where the cross-sectional area is transiently enlarged.

By hydrogenating inferior crude oil with the fluidized bed reactor having an inner circulation zone and a phase separator, the conversion rate of liquid-phase heavy components can be enhanced. The structure of such a fluidized bed reactor may improve the mass transfer and heat transfer effects between the flows within the reactor.

Another object of the invention is to provide a hydrogenation method of a fluidized bed reactor, which can ensure a stable operation of the fluidized bed device during addition of catalyst and thus ensure the operational cycle of the device, and also can improve the product quality by further processing the flow after the reaction in the fluidized bed.

The technical solution of the hydrogenation method of the fluidized bed reactor of the present invention is as follows.

After heated by a heating furnace, a blend of inferior crude oil with hydrogen enters into a fluidized bed reactor in an upward flow mode for catalytic hydrogenation reaction, and the effluent is subject to gas-liquid separation. Part of the liquid-phase resultant enters into an expanded bed reactor, which is connected to the fluidized bed reactor through a line, for further reaction. When the catalyst in the fluidized bed reactor cannot meet the demand on catalyst activity and cannot guarantee product quality, fresh catalyst should be supplemented from the expanded bed reactor. The amount of catalyst that the expanded bed reactor needs shall be supplemented by a fresh catalyst adding tank.

In the method of the present invention, the bed expansion ratio of the expanded bed reactor is 5 v % to 25 v %, preferably 10 v %~25 v %, most preferably 15 v %-20 v %. The term "expansion ratio" in the present invention means the ratio of the difference between the bed level after catalyst expansion and the bed level after original load of catalyst to the bed level after original load of catalyst. The operating conditions for said expanded bed reactor is as follows: the reaction pressure is 6-30 MPa, preferably 10-18 MPa; the reaction temperature is 350-500° C., preferably 380-430° C.; the space velocity is 0.1-5 $h^{-1}$, preferably 1-4 $h^{-1}$; and the volume ratio of hydrogen to oil is 400-2000, preferably 600-1500.

The amount of catalyst added into the expanded bed reactor per time is 2 to 20 times as much as the amount required for online adding catalyst to the fluidized bed reactor per time. When the catalyst remaining in the expanded bed reactor is 0 to 5 times as much as a single online replacing amount for the fluidized bed reactor, the catalyst shall be supplemented from a fresh catalyst adding tank located at the upper part of the expanded bed reactor.

After gas-liquid separation, the liquid-phase resultant entering into the expanded bed reactor amounts to 5 wt % to 70 wt % of the total liquid-phase resultant after reaction, preferably 10 wt % to 50 wt %.

In the method of this present invention, said inferior crude oil comprises one or more of atmospheric residue, vacuum residue, deasphalted oil, oil sands bitumen, thick crude oil, coal tar and coal liquefied heavy oil.

The operating conditions for said fluidized bed reactor are as follows: the reaction pressure is 6-30 MPa, preferably 10-18 MPa; the reaction temperature is 350-500° C., preferably 400-450° C.; the space velocity is 0.1-5 h$^{-1}$, preferably 0.5-3 h$^{-1}$; and the volume ratio of hydrogen to oil is 400-2000, preferably 600-1500.

According to the method for hydrogenating inferior crude oil of the present invention, the catalyst used in the reactor can be conventional catalyst for the fluidized bed hydrogenation in the field. Typically the catalyst has the following properties: with refractory inorganic oxide as the carrier, with Group VIB and/or Group VIII metal as the active component, the particle diameter of catalyst being 0.8 mm, the particle length being 3-5 mm, and the basis physical-chemical properties being substantially the same as those of conventional catalyst for the fixed bed hydrogenation. Preferably, in the invention a catalyst having the following properties is used. The particle diameter of the catalyst is 0.1-0.8 mm, preferably 0.1-0.4 mm. The catalyst contains active hydrogenating metal components of Group VIB and/or Group VIII. The carrier is $Al_2O_3$. The catalyst contains at least one auxiliary agent selected from the following elements: B, Ca, F, Mg, P, Si, Ti, etc. The content of the auxiliary agent is 0.5 wt % to 5.0 wt %. The pore volume of the catalyst is 0.6 to 1.2 mL/g. The pore volume with a pore size less than 8 nm is less than 0.03 mL/g, generally between 0.005 and 0.02 mL/g. The average pore diameter is 15-30 nm. The pore volume with a pore size between 15-30 nm occupies 50% or above of the total pore volume, generally 50% to 70%. The specific surface area is 100-300 m$^2$/g, preferably 120-240 m$^2$/g.

The catalyst comprises 1.0 wt %-20.0 wt % of group VIB metallic oxide (e.g., $MoO_3$), preferably 3.0 wt % to 15.0 wt %, and 0.1 wt %-8.0 wt % of group VIII metallic oxide (e.g., NiO or CoO), preferably 0.5 wt %-5.0 wt %. The catalyst wear is equal to or less than 0.1 wt %.

The catalyst used in the fluidized bed reactor is microspheric catalyst having a particle size of 0.1-0.8 mm. Currently, in the conventional fluidized bed reactor, e.g., the reactor disclosed in U.S. Re 25,570 and the related patents having an inner circulation cup mainly for the purpose of effective separation of gas and liquid, the catalyst used therein has substantially the same particle size as conventional hydrogenation catalyst, and hence the method of this invention is not suitable for the conventional fluidized bed reactor.

The fluidized bed reactor used in the method of the present invention can use a fluidized bed reactor including inner components such as gas-liquid-solid tri-phase separator and guiding aperture, etc. therein. For example, the fluidized bed reactors disclosed in CN1448212A and CN101376092A are both suitable for the hydrogenation method of the present invention. Though said reactors can be used in the method of the present invention, considering that most of effective reaction region in the fluidized bed reactor is of a cylinder structure, which has a bad mass transference effect, the hydrogenation effect using such reactors is not significant. Meanwhile, the back-mixing reactors will discharge part of the unreacted raw material out of the reactors together with the reacted material flow, hence the conversion rate of raw material is rather low.

In the method of hydrogenating inferior crude oil according to the present invention, heavy crude oil can be treated with a combined process, in which a fluidized bed reactor having an inner circulation zone and a tri-phase separator and an expanded bed are used. In this way, not only can the quality of light oil products be improved, but also ensure a stable operation in the main reactor, i.e., the fluidized bed reactor, during catalyst charging. With this combined process, heavy oil can be processed under a flexible operating mode. Firstly, heavy crude oil is subjected to hydrogenation cracking reaction via a fluidized bed hydrogenation reactor, and after reaction the flow enters into a separating device to obtain the gas-phase resultant and the liquid-phase resultant, wherein part of the liquid-phase resultant is recycled to the expanded bed reactor for further hydrogenation. When the fluidized bed reactor needs to be charged catalyst, the flow entraining catalyst enters into the fluidized bed reactor from the lower part of the expanded bed reactor. This flexible operating process overcomes the current problem of fluctuations of temperature and pressure in the reactor caused by directly charging catalyst into the fluidized bed reactor, and removes the influence of the current charging method on the fluidizing state of catalyst and the reaction flow properties (for instance, causing an unstable operation, an undesirable catalyst entraining or catalyst bed expansion, influencing product quality and operation cycle of the devices, etc.). In the present invention, however, fresh catalyst is firstly charged into an expanded bed reactor and then to a fluidized bed reactor, thus generating a buffering effect; meanwhile, the catalyst can be preheated by the flow to the reaction temperature in the expanded bed reactor, such that the temperature of liquid, catalyst and gas that enter into the following fluidized bed reactor is substantially equal to the reaction temperature of the fluidized bed, and a stable operation of the fluidized bed device can be achieved. Further, by firstly contacting fresh catalyst with the flow having properties that are greatly improved by the fluidized bed hydrogenation, the initial activity of catalyst can be utilized sufficiently, avoiding carbon accumulation of catalyst at the initial stage and thus its influence on the effect of the catalyst.

Beneficial Effect of the Present Invention

The present invention's technique is simple, scientific and reasonable. As compared with the prior arts, the fluidized bed reactor and the hydrogenation method thereof according to the present invention present the following advantages:

1) In the fluidized bed reactor according to the method of the present invention, one or more circulation zones are provided, which may form several fluidizing operation zones, enabling the operation of the whole fluidized bed reactor more flexible.

2) The presence of circulation zones prolongs residence time of liquid component in the fluidized bed reactor, resulting in a better yield of light oil.

3) Since the fluidized bed reactor is one with a rather high back-mixing level, the effluent of the reactor generally contains part of the unreacted raw material. Through arranging a plurality of small inner circulation zones, raw material can be conversed in cycle for several times, and the conversion ratio can be enhanced.

4) The phase separator of the fluidized bed reactor is of a simple cylinder structure, which has advantages of simple manufacturing process, low production cost and easy installation and maintenance compared to the taper or cone shaped phase separator of the prior arts.

5) The technology using an expanded bed reactor and a fluidized bed reactor in combination, as compared with a single reactor, prolongs the reaction path and time, improves the impurity removal rate of the reactants, and enhances the product quality accordingly.

6) The three operation modes, i.e., fluidized bed hydrogenation of raw material, further hydrogenation of flow being reacted in the fluidized bed already in the expanded bed, and online charging catalyst, can be reasonably matched with each other. Therefore, not only can the quality of the final products be improved, but also can ensure a long-term stable operation of the device under the precondition that the raw material of the fluidized bed hydrogenation method is widely adaptable.

7) Charging fresh catalyst first into the expanded bed reactor and then to the fluidized bed reactor may buffer and preheat the catalyst, enabling the whole operation cycle being stable. Meanwhile, through contacting fresh catalyst with the fluidized bed hydrogenated liquid resultant having properties that are greatly improved, the initial activity of catalyst can be utilized sufficiently, ensuring a stable exertion of the catalyst's activity.

BRIEF DESCRIPTION OF THE DRAWINGS

The drawings are provided for understanding of the present invention. They constitute part of the description and can be used to construe the present invention in combination with the description, without restricting the present invention. In the drawings.

Figure 1:
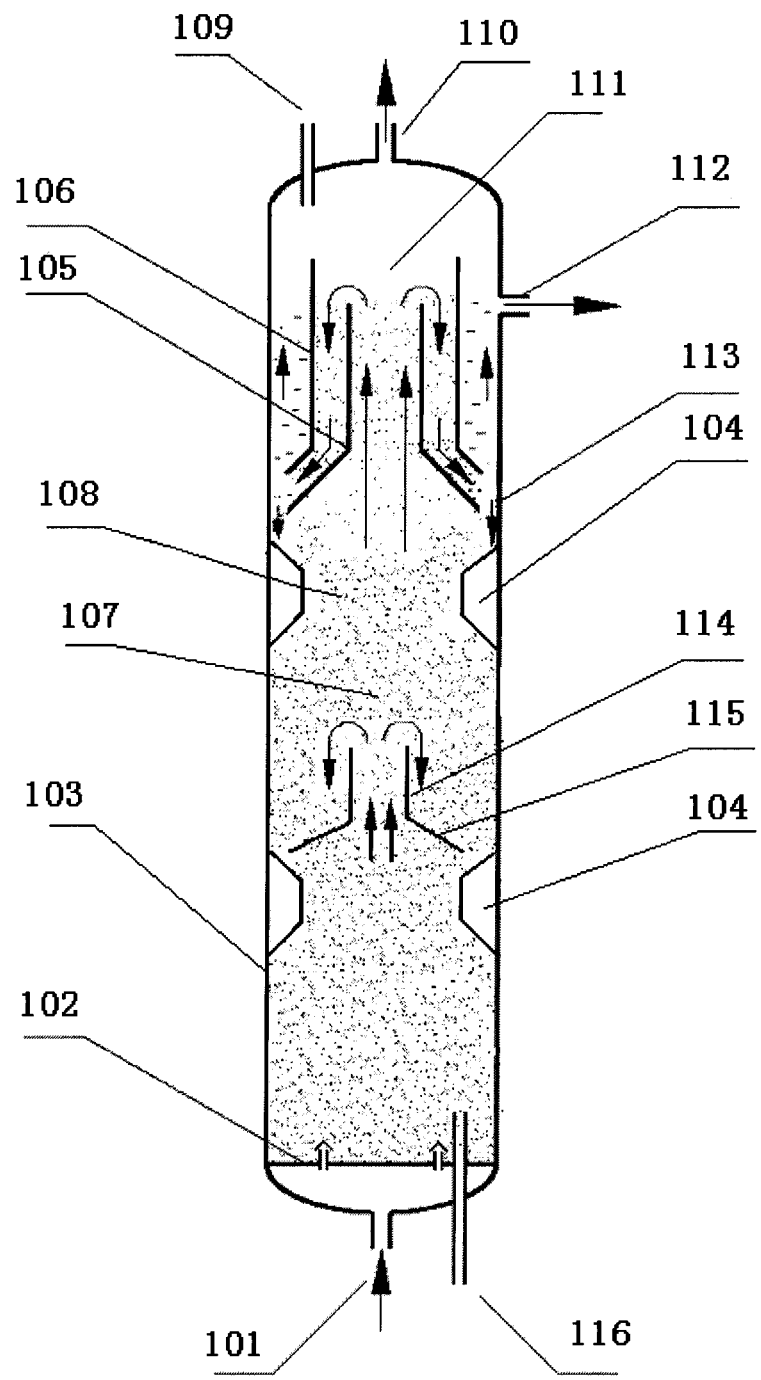
FIG. 1 shows the structure of the fluidized bed reactor of the present invention (with one circulation zone).

The reference numbers as shown in the drawings and in the examples of the present invention are as follows:

1 catalyst; 2 catalyst storage tank; 3 expanded bed reactor; 4, 5, 11 hydrogen; 6 heavy hydrocarbon raw material; 7 fluidized bed reactor; 8 high-pressure separating device; 9 cooling and purifying device; 10 distilling device; 12 gasoline; 13 diesel; 14 hydrogenated tail oil; 15 catalyst discharging line; 16, 17, 18 valve;

101 feeding port; 102 gas-liquid distributor; 103 reactor shell; 104 guiding structure; 105 inner cylinder; 106 outer cylinder; 107 catalyst bed; 108 guiding aperture; 109 catalyst inlet; 110 gas outlet; 111 phase separator; 112 liquid outlet; 113 downflow feeding opening; 114 cylinder; 115 tapered diffusion section; 116 catalyst discharging opening.

SPECIFIC EMBODIMENTS

Hereinbelow the preferred examples of the present invention are illustrated in combination with the drawings. It shall be understood that the preferred examples described herein are only used for illustrating and explaining the present invention, but shall in no way be construed as restricting the present invention.

As shown in FIG. 1, in a specific embodiment of the present invention, the fluidized bed reactor used comprises an inner circulation zone and a triphase separator, and the structural features and operating mechanism are as follows.

The reaction raw material, after being blended, enter into the reactor through a feeding port 101, and then homogeneously pass through catalyst bed 107 via a gas-liquid distributor 102. The catalyst amount in reactor shell 103 is at least 35% of the reactor volume, generally 40%~70%, preferably 50%~60%. Under the entraining effect of the gas-liquid flow, the catalyst bed can be expanded to a certain height, and its volume after expansion is generally 20%~70% larger than its static volume. The gas-liquid flow entering into the reaction zone is then contacted and reacted with the catalyst, and the reacted gas-liquid flow and the non-converted raw material and hydrogen carry solid catalyst and flow upward along the axis of the reactor to a circulation zone formed by a guiding structure 104, a cylinder 114 and a tapered diffusion section 115. The flow passes through a guiding aperture 108 formed by the guiding structure 104 and the tapered diffusion section 115 of the cylinder, and are collected into a fluid passage of cylinder 114. Nevertheless, since the cross sectional area of the fluid passage is narrowed, the flow speed of the gas-liquid fluid is increased. When the fluid passes the top of the cylinder, the fluid passage is enlarged immediately; hence the flow speed of the gas-liquid fluid is decreased transiently, and its capability of carrying solid catalyst is reduced, resulting in that part of the unreacted liquid and the unconverted raw material and the solid catalyst downflow into the guiding aperture along the passage formed by the outer wall of the cylinder and the inner wall of the reactor, and are blended with the upward flow from the lower part of the reactor, thus forming a small circulation zone. The gas-phase flow, part of liquid-phase flow and the catalyst carried therewith which are moving up from the circulation zone enter into a guiding aperture 108 formed by a guiding structure 104 immediately adjacent to a phase separator 111, and then enter into the phase separator 111 for phase separation. Gas is separated first, which is discharged out of the reactor from a gas outlet 110. The separated catalyst returns to the reaction zone through a downflow opening 113. The clear liquid-phase resultant substantially containing no catalyst particles is discharged out of the reactor from the liquid outlet 112. In order to promptly discharge the deactivated catalyst out of the reactor and charging fresh catalyst, fresh catalyst can be supplemented into the reaction system through a catalyst charging pipe 109 at the upper part of the reactor, and part of the deactivated catalyst can be discharged out of the reactor through a discharging pipe 116 at the lower part of the reactor.

The longitudinal section of the guiding structure 104 along the axis of the reactor is a trapezoid, the coverage angle and friction angle thereof are both acute angles, preferably both less than 60 degrees. Of course, the longitudinal section of the guiding structure 104 along the axis of the reactor may also be an arch or other appropriate shapes.

The phase separator 111 is composed by an inner cylinder 105 and an outer cylinder 106 that are concentric with each other but with different diameters, in combination with the inner wall of the reactor shell 103. The inner cylinder 105 forms the central tube of the phase separator. The annular space between the inner cylinder 105 and the outer cylinder 106 forms the baffling tube of the phase separator. The annular space between the outer cylinder 106 and the inner wall of the reactor shell 103 is a region for collecting clear liquid products. The opening of the diffusion section at the lower end of said central tube is a flow inlet, and the annular opening formed by the opening of this diffusion section and the inner wall of the reactor shell 103 is the catalyst downflow feeding opening. In order to increase the flow speed within the baffling tube and improve the separating effect, the cone vertex angle of the diffusion section of the outer cylinder is generally at least 20 degrees, preferably 40-80 degrees, less than that of the diffusion section of the inner cylinder.

Figure 2:
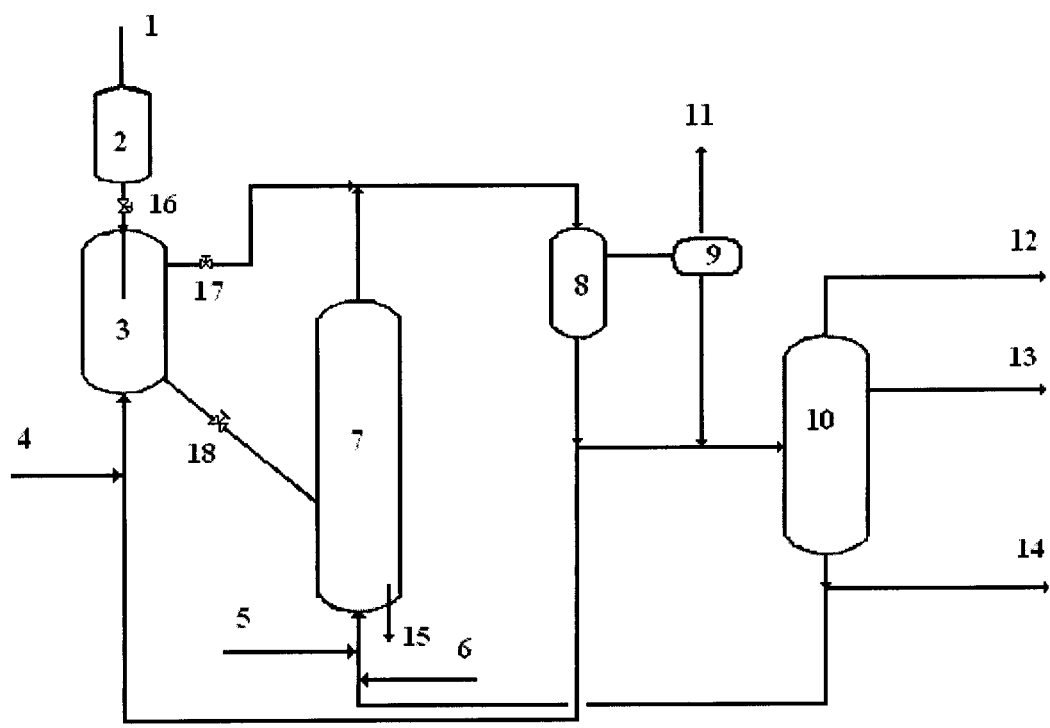
FIG. 2 shows the process of the fluidized bed reactor hydrogenation method of the present invention.

As shown in FIG. 2, the fluidized bed reactor hydrogenation method of the present invention is as follows. A blend of heavy hydrocarbon-containing raw material 6 and hydrogen 5, after being heated by a heating furnace, enters into the fluidized bed reactor 7 in a upflow manner, and is contacted and reacted with the catalyst. After hydrogenated in the fluidized bed, the flow is discharged from the top of the reactor and then enters into a high pressure separating device 8 for gas-liquid separation. Part of the separated liquid-phase resultant is blended with hydrogen 4, and then upflow to an expanded bed reactor 3 for further hydrogenation reaction. The reacted resultant is discharged from the upper part of expanded bed reactor 3 and enters the high pressure separation device 8. The gas flow separated from the high pressure separation device 8 is treated in a cooling and purifying device 9; subsequently, the gas-phase can be used as recycled hydrogen 11, while the condensed light component is blended with part of the liquid-phase flow from the separating device and then enter a distilling device 10, so that gasoline 12, diesel 13 and hydrogenated tail oil 14 can be obtained. The hydrogenated tail oil can be used as raw material for catalytic cracking or fixed bed residual oil hydrogenation, or can be recycled to the fluidized bed reactor 7. When the catalyst activity in the fluidized bed reactor is reduced such that product of required quality cannot be provided, catalyst needs to be replaced. The operation procedure is: discharging part of the deactivated catalyst in the fluidized bed reactor out of the reactor through a catalyst discharging line 15, opening a valve 18 in the line connecting the expanded bed reactor 3 with the fluidized bed reactor 7 and at the same time closing a valve 17 in the flow discharging line of the expanded bed reactor, such that the flow containing solid catalyst enters into the fluidized bed reactor 7, and the time for online catalyst charging is 10~50 min. After charging catalyst to the fluidized bed reactor 7 is completed, the normal process is resumed. Catalyst is charged into the expanded bed reactor 3 as follows: firstly loading catalyst 1 into the catalyst storage tank 2, charging hydrogen to the storage tank to a pressure slightly higher than the pressure of the expanded bed by 1~5 Pa, opening a valve 16 positioned between the catalyst storage tank 2 and the expanded bed 3, and adding fresh catalyst into the expanded bed reactor 3.

To further illustrate the technical solution and effect of the present invention, Examples are provided hereinbelow, wherein all percentages related refer to weight percentages.

Example 1

The residual oil used in the test has properties as listed in Table 1. From Table 1 it can be seen that the carbon residue content in the residual oil is 13.6 wt %, metal content is 141.9 $\mu g \cdot g^{-1}$, bitumen content is 6.4 wt %, sulphur content is 2.5 wt %, and nitrogen content is 0.6 wt %.

The microspheric catalyst used in the test has an average diameter of 0.6 mm, a pore volume of 0.60 mL/g and a specific surface area of 140 m$^2$/g, with alumina oxide as the carrier. The pore volume less than 8 nm amounts to 2.6% of the total pore volume, and the pore volume of 15~30 nm amounts to 65% thereof. The catalyst contains 11.2 wt % of MoO$_3$, 3.0 wt % of NiO and 1.4 wt % of P.

The test adopts a conventional fluidized bed hydrogenation process, with the fluidized bed reactor including one inner circulation zone as shown in FIG. 1.

There is one circulation zone in the fluidized bed reactor, and the fluidized bed reactor is sized as follows: the inner size of the reactor shell is 160 mm; the height of the reactor shell is 3000 mm; the effective volume of the shell is 60 L; the height of the separator is 380 mm; the diameter of the cylindrical part of the central tube of the separator is 92 mm; the bottom diameter of the tapered opening at the lower part of the inner cylinder is 144 mm; the height of the tapered portion at the lower part of the inner cylinder is 41 mm; the diameter of the cylindrical part of the outer cylinder is 128 mm; the bottom diameter of the opening of the tapered part of the outer cylinder is 138 mm; the height of the tapered part is 64 mm; the upper opening of the outer cylinder is higher than the upper opening of the inner cylinder; the bottom location of the tapered opening at the lower part of the outer cylinder is higher than the bottom location of the tapered opening at the lower part of the inner cylinder, with a height difference of 38 mm; the vertical distance between the upper opening of the outer cylinder of the separator and a tangent at the top of the reactor shell is 200 mm; and the vertical distance between the center of liquid product tube center and the tangent at the top of the reactor is 338 mm. The annular guiding structure has a coverage angle of 20°, a friction angle of 28°, and a diameter of the guiding aperture adjacent to the phase separator of 100 mm. For forming the circulation zone, the diameter of the guiding aperture is 100 mm, the inner diameter of the cylinder is 80 mm, the cylinder height is 100 mm, the bottom diameter of the tapered diffusion section is 150 mm, and the height of tapered diffusion section is 45 mm.

Comparative Example 1

In this Comparative Example 1, the reactor has a basic structure the same as that of Example 1, and the only difference lies in that there is no circulation zone in the reactor. The reaction conditions and raw material for test are the same as those of Example 1. Its specific experimental conditions and results are listed in Table 2.

TABLE 1

Properties of the Raw Material

| Item | Data |
|---|---|
| Density (20° C.), kg · m$^{-3}$ | 1007.8 |
| Carbon residue, wt % | 13.6 |
| Viscosity (100° C.), mm$^2$/s | 576.7 |
| Solidifying point, ° C. | 40 |
| Elementary analysis, wt % | |
| C/H | 86.1/10.3 |
| S/N | 2.5/0.6 |
| Metal element, μg · g$^{-1}$ | |
| Fe/Ni/V | 2.9/38.6/100.4 |
| Four components analysis, wt % | |
| Saturated hydrocarbon | 29.0 |
| Aromatic hydrocarbon | 33.1 |
| Colloid | 31.5 |
| Asphaltene | 6.4 |

TABLE 2

Experimental Conditions and Results

| Item | Example 1 | Comparative Example 1 |
|---|---|---|
| Crude oil | GDAR | GDAR |
| Reaction temperature, ° C. | 445 | 445 |
| Reaction pressure, MPa | 15 | 15 |
| Hydrogen-oil volume ratio | 500 | 500 |
| Liquid hourly space velocity, h$^{-1}$ | 2 | 2 |
| Catalyst load, L | 50 | 50 |
| Test results | | |
| desulfurization rate, wt % | 79 | 65 |
| demetalization rate, wt % | 89 | 74 |
| 500° C.$^+$ residual oil conversion rate, wt % | 65 | 54 |

Example 2

This Example relates to a hydrogenation method with the fluidized bed reactor according to the present invention. The operation process is as shown in FIG. 2, and there is one inner circulation zone arranged in the fluidized bed reactor.

The process is as follows. Heavy hydrocarbon-containing raw material 6, after being blended with hydrogen 5, enters into the fluidized bed reactor 7 in an upflow manner and is contacted and reacted with the catalyst. After hydrogenated in the fluidized bed, the flow is discharged from the top of the reactor and enters into the high pressure separating device 8 for gas-liquid separation. The liquid-phase resultant amounting to 15 wt % of the reacted liquid-phase flow is blended with hydrogen 4, and upflows into the expanded bed reactor 3 for further hydrogenation reaction. The reacted resultant is discharged from the upper part of the reactor into the high pressure separating device 8. The gas flow separated from the high pressure separating device is treated in the cooling and purifying device 9. The gas phase can be used as recycled hydrogen 11, and the condensed light component is blended with part of the liquid-phase flow from the separating device, and the blend enters into the distilling device 10 for obtaining gasoline 12, diesel 13 and hydrogenated tail oil 14. When the catalyst activity in the fluidized bed reactor is reduced such that product of required quality cannot be provided, it is necessary to replace catalyst. The operation process is: discharging part of the deactivated catalyst in the fluidized bed reactor out of the reactor through the catalyst discharging line 15, opening the valve 18 positioned at the line connecting the expanded bed reactor 3 with the fluidized bed reactor 7, and at the same time closing the valve 17 located in the flow discharging line of the expanded bed reactor, such that the flow containing solid catalyst enters into the fluidized bed reactor 7, the time for online catalyst charging being 20 min. Catalyst is added into the expanded bed reactor as follows: firstly loading catalyst 1 into the catalyst storage tank 2, charging hydrogen to the storage tank to a pressure slightly higher than the pressure of the expanded bed by about 2 Pa, opening the valve 16 located between the catalyst storage tank 2 and the expanded bed 3, and adding fresh catalyst into the expanded bed reactor. In this method, the expansion height of the catalyst bed in the expanded bed reactor is 20 v %, and the amount of catalyst added into the expanded bed reactor per time is ten times as much as the amount required for online adding catalyst in the fluidized bed reactor per time. When the catalyst remaining in the expanded bed reactor is four times as much as a single online replacing amount for the fluidized bed reactor, fresh catalyst is supplemented from the catalyst storage tank 2.

The operating conditions of the fluidized bed reactor and the expanded bed reactor are listed in Table 3, and the reaction results are shown in Table 4.

Example 3

The process of Example 3 is the same as that of Example 2, and the basic structure of the fluidized bed reactor is the same as that of Example 1, except that there are two circulation zones in the fluidized bed reactor of Example 3.

Comparative Example 2

The process of Comparative Example 2 is substantially the same as that of Example 2, except that no expanded bed is provided. Hence, when the catalyst activity in the fluidized bed reactor is reduced to such a level that product of required quality cannot be provided and fresh catalyst needs to be added, fresh catalyst is added to the fluidized bed reactor directly from a catalyst storage tank arranged at the top of the fluidized bed reactor. The adding procedure is the same as that of adding fresh catalyst to the expanded bed reactor from the catalyst storage tank as stated in Example 1. In addition, the catalyst and crude oil raw material used in Comparative Example 2 are the same as those of Example 1 respectively.

The operating conditions and test results of Comparative Example 2 are shown in Table 3 and Table 4 respectively.

TABLE 3

| Reaction Conditions | | | |
|---|---|---|---|
| | No. | | |
| | Example 2 | Example 3 | Comparative Example 2 |
| Expanded bed reactor | | | |
| Reaction temperature, ° C. | 425 | 422 | |
| Reaction pressure, MPa | 15 | 15 | |
| Reaction space velocity, $h^{-1}$ | 1.0 | 1.0 | |
| Hydrogen-oil volume ratio | 1500 | 1500 | |
| Fluidized bed reactor | | | |
| Reaction temperature, ° C. | 425 | 422 | 425 |
| Reaction pressure, MPa | 15 | 15 | 15 |
| Hydrogen-oil volume ratio | 700 | 700 | 700 |
| Reaction space velocity, $h^{-1}$ | 1.5 | 1.5 | 1.5 |

TABLE 4

| Reaction Results | | | |
|---|---|---|---|
| | No. | | |
| | Example 2 | Example 3 | Comparative Example 2 |
| Gasoline (180° C.$^-$) | | | |
| S, $\mu g \cdot g^{-1}$ | 70 | 45 | 360 |
| N, $\mu g \cdot g^{-1}$ | 6.5 | 2.1 | 45 |
| Yield, wt % | 8.4 | 9.5 | 2.5 |
| Diesel (180~350° C.) | | | |
| S, $\mu g \cdot g^{-1}$ | 160 | 98 | 580 |
| N, $\mu g \cdot g^{-1}$ | 81.7 | 45.1 | 179 |
| Yield, wt % | 30.7 | 41.7 | 25.4 |
| Hydrogenated tail oil (350° C.$^+$) | | | |
| S, wt % | 0.22 | 0.19 | 0.9 |
| N, wt % | 0.12 | 0.1 | 0.2 |
| Carbon residue, wt % | 0.31 | 0.27 | 5.4 |
| Metal (Ni + V), $\mu g \cdot g^{-1}$ | 8 | 4 | 50 |
| Yield, wt % | 58.2 | 43.8 | 72.1 |

From the test results of Table 4 it can be seen that, as compared with Comparative Example 2, the contents of impurities S and N in Example 2 and Example 3 are all reduced greatly, and the recovering rates of gasoline and diesel with comparatively high added value are enhanced to some extents. In short, by adopting the techniques of the present invention and the fluidized bed having inner circulation zone therein for hydrogenation of inferior crude oil, not only may the product quality and the yield of light oil be significantly enhanced, but also it may provide qualified raw material for catalytic cracking. During operation of the tests, it is found that the catalyst adding mode used in the present invention can ensure a constant stable operating state of the main reactor, i.e., the fluidized bed reactor, which guarantees a stable operation of the device and a stable product quality.

As shown in Table 2, by using the fluidized bed reactor having a circulation zone therein as defined in Example 1, the hydrodesulfurization and hydrodenitrification effect as well as the residual oil conversion rate can be effectively enhanced.

Lastly, it should be noted that the above stated examples are only preferable examples of the present invention and shall not be construed as limitation of the present invention. Though the present invention is illustrated with reference to the preceding Examples in details, persons skilled in the art can still make amendments to the technical solutions as disclosed in the those examples, or make equivalent replacement to part of the technical solutions therein. Any amendment, equivalent replacement or improvement under the spirit and principle of the present invention shall all be included in the protection scope of the present invention.

What is claimed is:

1. A fluidized bed reactor, comprising a reactor shell vertical to the ground, a phase separator at the upper part of the shell, and an inner circulation zone provided under the phase separator, wherein:

said inner circulation zone comprises a cylinder, a tapered diffusion section and a guiding structure, wherein said cylinder and said tapered diffusion section at the lower end of the cylinder are both located within the reactor shell, said guiding structure is located on the inner wall of the reactor shell at the lower end of the tapered diffusion section, and said guiding structure is an annular protrusion on the inner wall of the reactor;

said phase separator comprises an inner cylinder and an outer cylinder that are concentric with different inner diameters, wherein the upper and lower ends of the inner and outer cylinders are all open, the opening of the upper end of the outer cylinder is higher than the opening of the upper end of the inner cylinder, and the opening of the lower end of the outer cylinder is higher than the opening of the lower end of the inner cylinder;

the lower end of the inner cylinder there is a tapered diffusion section, the diameter of the opening of which is less than the inner diameter of the reactor; and the lower end of the outer cylinder there is also a tapered diffusion section, the diameter of the opening of which is also less than the inner diameter of the reactor.

2. The fluidized bed reactor according to claim 1, characterized in that 2 to 3 inner circulation zones are provided.

3. The fluidized bed reactor according to claim 1, characterized in that the guiding structure is arranged between the phase separator and the inner circulation zone, and is an annular protrusion in the inner wall of the reactor.

4. The fluidized bed reactor according to claim 1, characterized in that the longitudinal section of the guiding structure along the axis of the reactor is one selected from a group consisting of trapezoid, arch, triangle and semicircle.

5. The fluidized bed reactor according to claim 1, characterized in that the guiding structure comprise a coverage angle and a friction angle, wherein the coverage angle and the friction angle of the guiding structure are both acute angles.

6. The fluidized bed reactor according to claim 5, characterized in that both of the coverage angle and the friction angle are less than 60 degrees.

7. The fluidized bed reactor according to claim 1, characterized in that the cone vertex angle of the diffusion section of the outer cylinder is about 20 to 80 degrees less than the cone vertex angle of the diffusion section of the inner cylinder.

8. The fluidized bed reactor according to claim 1, characterized in that the diameter of the guiding aperture formed by the guiding structure is in a range between the diameters of the inner cylinder and outer cylinder of the phase separator.

9. The fluidized bed reactor according to claim 1, characterized in that in the reactor shell a distribution plate is provided at the bottom thereof.

10. The fluidized bed reactor according to claim 1, characterized in that the fluidized bed reactor further comprises a liquid outlet, wherein the liquid outlet of the fluidized bed is arranged at the upper part of the reactor shell between the opening of the upper end of the inner cylinder of the phase separator and the opening of the lower end of the outer cylinder thereof.

11. The fluidized bed reactor according to claim 1, characterized in that the upper end of the cylinder is a flare-shaped structure slightly spreading out.

12. A hydrogenation method of the fluidized bed reactor according to claim 1, characterized in comprising the following steps: first catalytically hydrogenating a blend of inferior raw material and hydrogen in the fluidized bed reactor according to claim 1; inputting part of liquid-phase products in products obtained after gas-liquid separation into an expanded bed reactor for further reaction therein, wherein said expanded bed reactor is connected to the fluidized bed reactor through a line; and supplementing catalyst from the expanded bed reactor when the catalyst within the reactor shell cannot meet the demand on catalyst activity.

13. The hydrogenation method of the fluidized bed reactor according to claim 12, characterized in that the operating conditions of the fluidized reactor are as follows: the reaction pressure is 6-30 MPa, the reaction temperature is 350-500° C., the space velocity is 0.1-5 $h^{-1}$, and the volume ratio of hydrogen to oil is 400-2000.

14. The hydrogenation method of the fluidized bed reactor according to claim 13, characterized in that the operating conditions of the fluidized bed reactor are as follows: the reaction pressure is 10-18 MPa, the reaction temperature is 400-450° C., the space velocity is 0.5-3 $h^{-1}$, and the volume ratio of hydrogen to oil is 600-1500.

15. The hydrogenation method of the fluidized bed reactor according to claim 12, characterized in that the operating conditions of the fluidized reactor are as follows: the bed expansion ratio is 5 v % to 25 v %, the reaction pressure is 6-30 MPa, the reaction temperature is 350-500° C., the space velocity is 0.1-5 $h^{-1}$, and the volume ratio of hydrogen to oil is 400-2000.

16. The hydrogenation method of the fluidized bed reactor according to claim 15, characterized in that the operating conditions of the fluidized bed reactor are as follows: the bed expansion ratio is 10 v %-25 v %, the reaction pressure is 10-18 MPa, the reaction temperature is 380-430° C., the airspeed space velocity is 1-4 $h^{-1}$, and the volume ratio of hydrogen to oil is 600-1500.

17. The hydrogenation method of the fluidized bed reactor according to claim 12, characterized in that the liquid-phase products after gas-liquid separation entering into the expanded bed reactor amounts to 5 wt % to 70 wt % of the total liquid-phase products after reaction in the fluidized bed reactor.

18. The hydrogenation method of the fluidized bed reactor according to claim 17, characterized in that the liquid-phase products after gas-liquid separation entering into the expanded bed reactor amounts to 10 wt % to 50 wt % of the total liquid-phase products after reaction in the fluidized bed reactor.

19. The hydrogenation method of the fluidized bed reactor according to claim 12, characterized in that the amount of catalyst added into the expanded bed reactor per time is 2 to 20 times as much as the amount required for online adding catalyst to the fluidized bed reactor per time, and when the catalyst remaining in the expanded bed reactor is 0 to 5 times as much as a single online replacement amount for the fluidized bed reactor, the catalyst absent shall be supplemented from a fresh catalyst adding tank.

20. The hydrogenation method of the fluidized bed reactor according to claim 12, characterized in that a carrier for the catalyst is refractory inorganic oxides, and active components thereof are selected from group VIB and group VIII metals.

21. The hydrogenation method of the fluidized bed reactor according to claim 20, characterized in that the catalyst has the following properties:
the catalyst particles have a diameter of 0.1 to 0.8 mm, the catalyst contains group VIB and group VIII active hydrogenation metal components, and the carrier is $Al_2O_3$;
the catalyst comprises at least one auxiliary agent, which is selected from the following elements: B, Ca, F, Mg, P, Si, Ti, the content of the auxiliary agent being 0.5 wt % to 5.0 wt %;
the pore volume is 0.6 to 1.2 mL/g, and the average pore diameter is 15-30 nm;
the pore volume with a pore diameter between 15-30 nm amounts to 50% or above of the total pore volume, and the pore volume with a pore diameter less than 8 nm being less than 0.03 mL/g; and
the specific surface area is 100-300 $m^2/g$.

22. The hydrogenation method of the fluidized bed reactor according to claim 21, characterized in that the group VIB active hydrogenation metal component is Mo, the content of which is 1.0 wt %-20.0 wt % based on metallic oxide $MoO_3$; and
the group VIII active hydrogenation metal component is Ni or Co, the content of which is 0.1 wt %-8.0 wt % based on NiO or CoO.

23. The hydrogenation method of the fluidized bed reactor according to claim 22, characterized in that the content of Mo is 3.0 wt %-15.0 wt % based on metallic oxide $MoO_3$, and the content of Ni or Co is 0.5 wt %-5.0 wt % based on NiO or CoO.

24. The hydrogenation method of the fluidized bed reactor according to claim 21, characterized in that the pore volume of the catalyst with a pore diameter less than 8 nm is 0.005-0.02 mL/g;
the pore volume with a pore diameter between 15 and 30 nm is larger than or equal to 50% but less than or equal to 70% of the total pore volume; and
the specific surface area of the catalyst is 120-240 $m^2/g$.

25. The hydrogenation method of the fluidized bed reactor according to claim 12, characterized in that said inferior crude is selected from one or more of atmospheric residue, vacuum residue, deasphalted oil, oil sands bitumen, thick crude oil, coal tar and coal liquefied heavy oil.

* * * * *